UNITED STATES PATENT OFFICE.

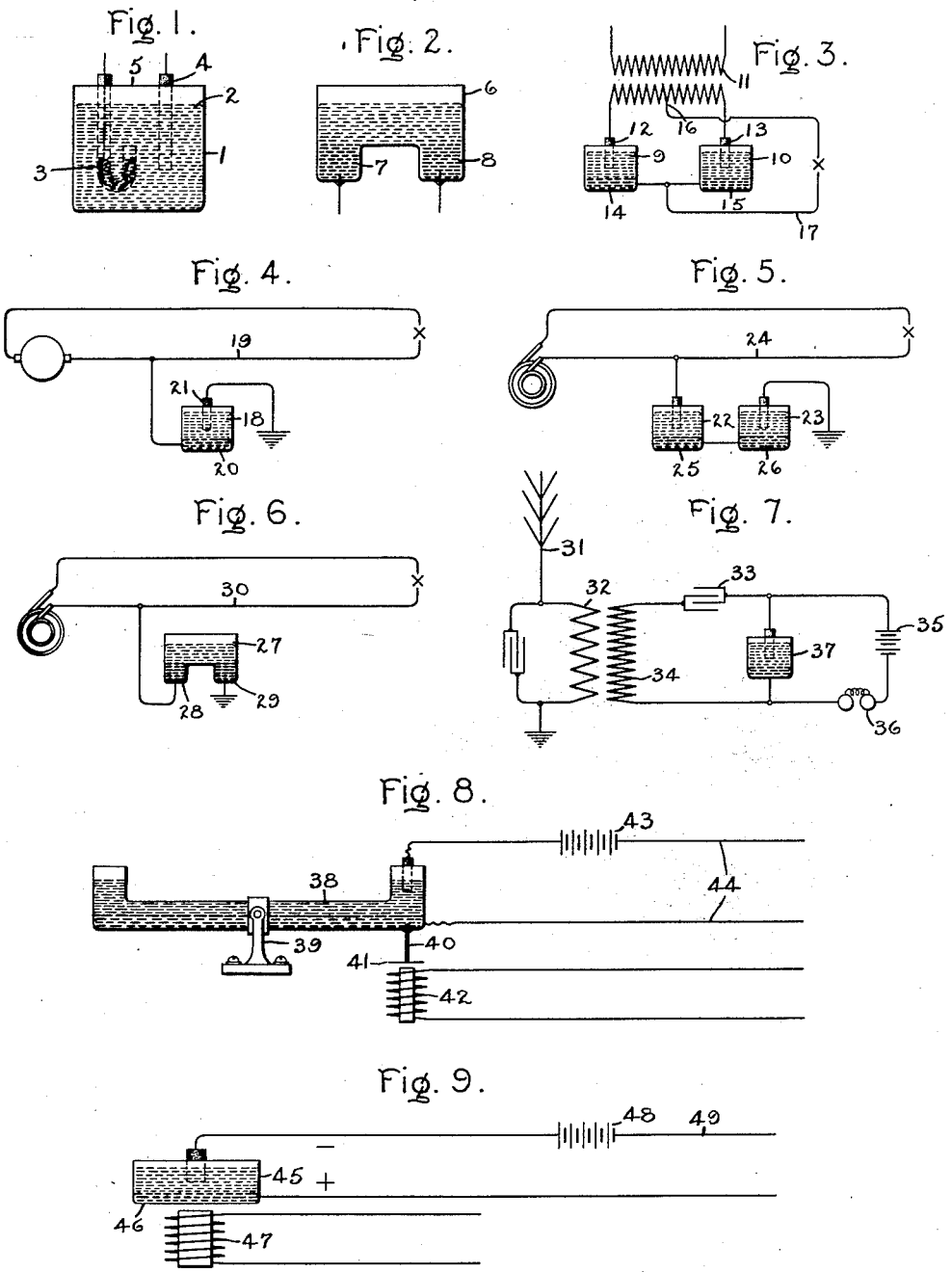

WILLIAM C. ARSEM, OF SCHENECTADY, NEW YORK, ASSIGNOR TO GENERAL ELECTRIC COMPANY, A CORPORATION OF NEW YORK.

ASYMMETRIC CELL.

No. 929,371.   Specification of Letters Patent.   Patented July 27, 1909.

Application filed March 18, 1908. Serial No. 421,890.

*To all whom it may concern:*

Be it known that I, WILLIAM C. ARSEM, a citizen of the United States, residing at Schenectady, county of Schenectady, State of New York, have invented certain new and useful Improvements in Asymmetric Cells, of which the following is a specification.

My invention relates in general to that class of electrolytic conductors which may be designated as asymmetric, that is, conductors which under certain conditions permit the flow of an electric current in one direction, but oppose a prohibitive resistance to the flow of the current in the reverse direction.

An electrolytic cell involving my invention has a metallic anode, such as a mercury anode, a coöperating cathode, and a solution containing an "anion" identical with the negative radical of an insoluble salt of the anode metal. An insulating film of the insoluble salt is formed upon the surface of contact of the anode with the electrolyte. This cell has the property of opposing a high resistance to an electric current when flowing in one direction but very little or no resistance when flowing in the reverse direction.

When the anode and cathode both consist of a metal, as mercury, capable of forming this high resistance film, in this case consisting of mercurous chlorid, HgCl the cell will oppose a high resistance to the flow of a current in either direction. When the coöperating electrode consists of some inert material as carbon, the cell is asymmetric, that is, the current flows through the cell when the mercury is made the cathode, but not in the reverse direction, or when the mercury is made the anode, as in this case, the film is dissolved. As will be hereinafter pointed out, this cell has certain other distinctive properties peculiar to itself.

Electrolytic cells having aluminum electrodes immersed in suitable electrolytes have asymmetric conductivity. The aluminum has the property of forming a film upon its surface which opposes a high resistance to the flow of the current. However, cells employing aluminum anodes must always undergo a preliminary "forming process," that is, the current must be passed through the cell and reversed several times in order to form the film upon the anode. This film, furthermore, deteriorates rapidly when the cell it not in use. In order to maintain the film a current must be passed through the cell at frequent intervals.

The asymmetric conductive properties of my electrolytic cell are entirely independent of any previous forming process. The cell, therefore, does not deteriorate on an open circuit. The troublesome requirement of allowing current to pass through the cell periodically, therefore, does not exist. Another advantage lies in the fact that the leakage of current is reduced to a very small minimum. I find the cell is very sensitive to mechanical disturbances, or vibrations. I believe this to be due to the fact that the anode material being liquid, the insulating film upon its surface is momentarily broken by any mechanical disturbance, and its insulating property is thus broken down to a greater or less degree for an extremely short interval of time. The peculiar properties of the cell render it useful for a variety of purposes. I make use of the asymmetric conductive properties of the mercury cell to rectify an alternating current, as will be subsequently described.

The high resistance which the cell offers to the passage of a current may be overcome by an electromotive force in excess of a certain limiting or critical value, and a current with an electromotive force exceeding the critical value will puncture the film and flow through the cell, opposed only by the resistance of the electrolyte itself. When the voltage falls below the initial value the film will be instantly and automatically repaired. This property of my cell makes it valuable as a means of diverting a current of high potential from a transmission line to the earth. As is well-known in the art, it is imperative that such protective devices should provide an easy path for the dangerously high potential, but should not allow the line current to follow by a path made conductive by the high potential discharge. As will be further pointed out, my electrolytic cell is peculiarly adapted to meet these conditions. Furthermore, the high resistance of the film, together with its property of instantly reforming after being punctured, makes the cell valuable as a coherer for the detection of electromagnetic waves in wireless telegraphy. The use of the cell in this connection will be hereinafter more fully described. As the resistance of the insulating film is sensitive to mechanical vibrations, the cell may be employed to advantage for the purpose of amplifying vibrations. It may be used in this connection in combination with a telephone relay, as will be hereinafter described.

The novel features of my invention are pointed out with particularity in the appended claims.

A complete understanding of my invention may be obtained from the following description taken in connection with the accompanying drawings.

Figure 1 shows in a diagrammatic manner a mercury cell with an inert electrode coöperating with the mercury electrode. Fig. 2 shows a cell in which both electrodes consist of mercury. Fig. 3 shows a combination of two mercury cells in combination with an alternating current circuit, so as to produce a rectified current. Fig. 4 shows a mercury cell connected between the line and earth of a direct current circuit, where it serves as a protective device. Fig. 5 shows a combination of two cells to be connected between an alternating current circuit and the earth. Fig. 6 shows how a cell in which both electrodes are mercury may be used for the same purpose. Fig. 7 shows how an asymmetric mercury cell may be used as a coherer for the detection of electromagnetic waves. Fig. 8 shows diagrammatically the combination of a mercury electrolytic cell with a telephone relay. Fig. 9 shows diagrammatically a slightly different arrangement to be used in connection with a telephone circuit.

In preparing my electrolytic cell I use as an electrolyte a solution containing an anion corresponding to the negative radical of an insoluble mercury salt,—for example, a $Cl^1$ ion, or a $PO^{111}_4$ ion. Various other electrolytes will readily suggest themselves. As a matter of illustration, I have used an electrolyte consisting of a 5% solution of mercuric chlorid, $HgCl_2$, acidified with hydrochloric acid, HCl. The acid is added to render the solution conducting. The critical voltage of the cell varies with the structure and composition of the film and, therefore, depends upon the kind of electrolyte used. Using an electrolyte containing a $Cl^1$ ion, I have obtained a critical voltage of about 65 volts.

The cell as shown in Fig. 1 consists of a container 1, filled with a suitable electrolyte 2. One electrode 3 consists of mercury. As mercury may still exert its chemical action when alloyed with certain other metals as tin, cadmium, lead, silver, copper, etc., I may use an amalgam of one or all of these metals for my active element. The coöperating electrode 4 may consist of some material as carbon which is inert with respect to the electrolyte 2. The electrodes are suspended in the electrolyte in any convenient way, as from an insulating cover 5.

Instead of using an inert cathode, both electrodes may consist of mercury, as shown in Fig 2, in which the container 6 is of such shape as to hold both mercury electrodes 7 and 8 normally separated. Such a cell will, of course, oppose a high resistance to an alternating current. Both electrodes being of mercury either may be used interchangeably as anode. Reference will be made subsequently to the use of a cell of this kind for lightning arrester purposes on alternating circuits.

Fig. 3 shows an example of circuit connections with mercury cells which can be used when it is desired to rectify an alternating current. Fig. 3 shows two mercury cells, 9 and 10, connected to a transformer 11, using the so-called neutral wire connection. The electrodes 12 and 13, which are connected to the ends of the transformer secondary, are composed of carbon, or any other material, inert with respect to the electrolyte. The mercury cathodes 14 and 15 are joined together and are connected to the neutral point 16 of the transformer secondary. With this arrangement a rectified current will be produced in the load circuit 17, as will be readily understood by those skilled in the art. When the cell is in operation a continual play of arcs is seen at the surface of mercury electrodes 14 and 15.

Fig. 4 shows how the mercury cell may be used as a protective device on the direct-current circuit. The cell 18 is connected between the direct-current circuit 19 and the ground in such a way as to make the mercury electrode 20 the anode. The electrode 21 may be of carbon, or other inert material. A current of dangerously high potential on direct-current circuit 19 will break down the resistance of the insulating film on the anode 20, and will be conducted harmlessly to the earth. As the puncture in the high resistance film will be instantly "healed", or re-formed, the line current cannot follow to the ground.

Fig. 5 shows a possible combination of two cells, 22 and 23, to be used on alternating-current circuit 24. The cells 22 and 23 have the mercury electrodes 25 and 26 connected together. It will be seen that no matter in what direction current may pass from the alternating-current circuit to the earth it will encounter a mercury anode: therefore, when the high potential discharge, such as the lightning discharge, has passed to the earth the alternating current can in no case follow.

Fig. 6 shows, as an alternative, the cell 27, in which both electrodes 28 and 29 are composed of mercury. One electrode is connected to the line 30, and the other to the earth. This cell offers a high resistance to the flow of current in either direction, and will, therefore, prevent either half wave of the alternating current from following the lightning discharge to the earth.

Fig. 7 shows how the mercury cell may be used as a coherer for a receiving instrument in wireless telegraphy. I have shown a familiar form of receiving instrument. The waves received by the antenna 31, flow through the primary circuit 32 of a transformer. The inductance of the transformer is neutralized by the condenser in series with the primary. The secondary 34 of the transformer forms part of a relay circuit in series with which is the condenser 33, the primary battery 35 and a detecting instrument as a relay coil 36. A mercury cell 37 is shunted across the primary cell 35 and the detecting instrument. Ordinarily little or no current will flow through the relay 36, because of the condenser 33 and the high resistance of the mercury cell 37. When, however, a current is induced in the secondary 34 the alternating-current flowing through the condenser 33, together with the battery voltage, will break down the resistance of the anode film in cell 37. As the battery current will follow for an instant, the discharge will be detected in the relay coil 36. As before referred to, the film on the surface of the mercury in my new electrolytic cell has the peculiar property of being sensitive to slight mechanical disturbances.

Fig. 8 shows diagrammatically how I employ this property of cell for the purpose of amplifying current pulsations as in a telephone circuit. The mercury cell 38 is pivotally balanced on the support 39, and is in contact at one end through the pin 40 with the diaphragm 41 of a telephone relay 42. Pulsations in the current flowing through the relay 42 cause vibrations of the diaphragm, and these vibrations are transmitted by means of the pin 41 to the electrolytic cell. These vibrations vary the resistance of the film, and as this cell is connected in series with a primary source of current, as battery 43, the pulsations of the current in the relay circuit are amplified in the outgoing circuit 44.

Fig. 9 shows a slightly modified arrangement, in which the mercury cell is similarly used for the purpose of amplifying current pulsations. As shown in this figure, a mercury cell 45 is provided with an iron diaphragm bottom 46. This diaphragm is affected by pulsations of current in the relay 47. The mechanical vibrations of the diaphragm increase, or decrease the surface of the mercury in the cell 45, and the rupturing of the film affects the resistance of the cell. As the cell is connected in series with a primary source of current, as the battery 48, the changes in resistance result in amplification of the pulsations in the outgoing circuit 49.

It is evident that my electrolytic cell may be used in a similar manner to intensify vibrations of sound in such devices as the phonograph, or microphone. I use for this purpose an arrangement similar to that shown in Fig. 8, diaphragm 41 being the reproducing diaphragm of a phonograph, or the vibrating member of a microphone transmitter.

What I claim as new and desire to secure by Letters Patent of the United States, is,—

1. In an asymmetric cell, the combination of an electrolyte, and electrodes, at least one of which will form an insoluble film having a chemical radical in common with the electrolyte.

2. The combination of an electrolytic cell containing an electrolyte, and electrodes, at least one of which will form an insoluble high resistance film having a negative radical corresponding to an anion of the electrolyte, and means for sending current through said cell when the resistance of said electrode film is momentarily broken down.

3. The combination of a cell containing an electrolyte, and electrodes, at least one of which will form an insoluble film, and means for indicating variations of the resistance of said cell produced by vibration.

4. The combination of an electrolytic cell containing an electrode, at least part of which consists of mercury, a coöperating electrode and a solution containing an anion of a relatively insoluble salt of mercury, and means for sending current through said cell.

5. The combination of an electrolytic cell containing an electrode, at least part of which consists of mercury, an additional electrode and a solution containing the anion of a relatively insoluble mercury salt, and means for indicating variations of the resistance of said cell produced by vibration.

6. In a relay device, the combination of a freely vibrating receptacle, a liquid electrode, a coöperating electrode, current connections, and a solution containing the anion of a relatively insoluble mercury salt.

7. In an electrolytic cell, the combination of a liquid metallic electrode, a coöperating electrode, an electrolyte containing an anion corresponding to the negative radical of an insoluble salt of the liquid metallic electrode, and means for disturbing the surface of the liquid electrode in contact with the electrolyte.

8. The combination of an electrolytic cell containing an electrode, at least part of which is mercury, an additional electrode, and a solution containing the negative radical of an insoluble salt of mercury, current connections, an electric circuit, and electromagnetic means for communicating vibrations to said cell which will correspond to variations of current in said electric circuit.

9. In an asymmetric cell, the combination of an electrode, at least part of which consists of mercury, another electrode, a solution containing the negative radical of an insoluble salt of mercury, current connections to said electrodes, and means for varying the resistance of the film formed upon the electrode containing mercury.

10. The combination of an electrolytic cell containing an electrode, at least part of which is mercury, an additional electrode, and a solution containing the negative radical of an insoluble salt of mercury, an electric circuit, means for communicating mechanical vibrations to said cell which will correspond to pulsations of current in said circuit, and means for indicating variations of the resistance of said cell produced by said vibrations.

11. An asymmetric conductor having electrodes one at least of which contains mercury, and a fluid medium associated therewith which will chemically form a high resistance film upon the mercury-containing electrode.

12. In an electrolytic cell, the combination of electrodes, at least one of which consists of mercury and an electrolyte containing a reagent which will interact with the mercury to form an insoluble, insulating film.

13. The combination of an electrolytic cell having electrodes, at least one of which consists of mercury, and an electrolyte containing a reagent which will interact with the mercury to form a high resistance film, and means for passing a current through said cell when the resistance of said film is momentarily broken down.

In witness whereof, I have hereunto set my hand this 17th day of March, 1908.

WILLIAM C. ARSEM.

Witnesses:
 HELEN ORFORD,
 BENJAMIN B. HULL.